United States Patent [19]
Rumreich

[11] Patent Number: 5,995,160
[45] Date of Patent: Nov. 30, 1999

[54] VIDEO SIGNAL PROCESSING SYSTEM PROVIDING INDEPENDENT IMAGE MODIFICATION IN A MULTI-IMAGE DISPLAY

[75] Inventor: Mark Francis Rumreich, Indianapolis, Ind.

[73] Assignee: Thomson Consumer Electronics, Inc., Indianapolis, Ind.

[21] Appl. No.: 08/769,333

[22] Filed: Dec. 19, 1996

[51] Int. Cl.⁶ .............................. H04N 5/445; H04N 5/45
[52] U.S. Cl. .......................... 348/564; 348/565; 348/589
[58] Field of Search .................................... 348/563, 564, 348/565, 569, 588, 589, 598, 606; H04N 5/445, 5/45

[56] References Cited

U.S. PATENT DOCUMENTS

| | | | |
|---|---|---|---|
| 5,602,598 | 2/1997 | Shintani | 348/565 |
| 5,671,019 | 9/1997 | Isoe et al. | 348/565 |
| 5,790,204 | 8/1998 | Yamaguchi | 348/564 |

FOREIGN PATENT DOCUMENTS 036601  5/1990  European Pat. Off. ........... H03J 9/00

OTHER PUBLICATIONS

Patent Abstracts of Japan, vol. 017, No. 404 (E–1405), Jul. 28, 1993 & JP 05 075949 A (Mitsubishi Electric Corp), Mar. 26, 1993.

Patent Abstracts of Japan, vol. 095, No. 004, May 31, 1995 & JP 07 015683 A (Toshiba Corp), Mar. 26, 1993.

Patent Abstracts of Japan, vol. 095, No. 004, May 31, 1995 & JP 07 015682 A (Hitachi Ltd) Jan. 17, 1995.

PCT International Search Report dated Apr. 8, 1998.

*Primary Examiner*—Sherrie Hsia
*Attorney, Agent, or Firm*—Joseph S. Tripoli; Peter M. Emanuel; David T. Shoneman

[57] ABSTRACT

Video signal processing apparatus provides for blanking main and auxiliary images in a multi-image display, e.g., a PIP or POP display, independently. The blanking may be part of a V-chip feature in which blanking occurs in response to auxiliary information, such as XDS data, that is included in a video signal to indicate the content of television programming. Main image blanking occurs only during active video intervals to prevent corrupting sync information. In a system that produces the main image from various types of video signals, e.g., composite video and s-video, that require separate signal processing paths, main image blanking capability is provided in one signal path only, such as the composite video path. The blanking capability is activated and the associated signal path is selected to provide main picture blanking regardless of which type of signal is providing the main picture.

20 Claims, 6 Drawing Sheets

| MAIN_BLANKING | SW1 | SW0 | S1 | S0 | Y | C |
|---|---|---|---|---|---|---|
| X | 0 | X | 0 | X | Y_BLANKED | C_BLANKED |
| 0 | 1 | 0 | 1 | 0 | SV1-Y | SV1-C |
| 1 | 1 | 0 | 0 | X | Y_BLANKED | C_BLANKED |
| 0 | 1 | 1 | 1 | 1 | SV2-Y | SV2-C |
| 1 | 1 | 1 | 0 | X | Y_BLANKED | C_BLANKED |

X = "DON'T CARE"

VIDEO SIGNAL PROCESSING SYSTEM PROVIDING INDEPENDENT IMAGE MODIFICATION IN A MULTI-IMAGE DISPLAY

CROSS-REFERENCE TO RELATED APPLICATIONS

This application is related to the following commonly-assigned U.S. patent application Ser. Nos. 08/770,770 (Attorney Docket No. RCA 88,200) entitled "METHOD AND APPARATUS FOR POSITIONING AUXILIARY INFORMATION PROXIMATE AN AUXILIARY IMAGE IN A MULTI-IMAGE DISPLAY", 08/769,329 (Attorney Docket No. RCA 88,231) entitled "TELEVISION APPARATUS FOR SIMULTANEOUS DECODING OF AUXILIARY DATA INCLUDED IN MULTIPLE TELEVISION SIGNALS", 08/769,331 (Attorney Docket No. RCA 88,489) U.S. Pat. No. 5,929,927 entitled "METHOD AND APPARATUS FOR PROVIDING A MODULATED SCROLL RATE FOR TEXT DISPLAY", and 08/769,332 (Attorney Docket No. RCA 88,490) entitled "METHOD AND APPARATUS FOR REFORMATTING AUXILIARY INFORMATION INCLUDED IN A TELEVISION SIGNAL", all of which were filed in the name of Mark F. Rumreich et al. on the same date as the present application.

FIELD OF THE INVENTION

The present invention involves video signal processing systems that provide a multi-image display, e.g., picture-in-picture (PIP) or picture-outside-picture (POP) displays.

BACKGROUND

A television signal may include auxiliary information in addition to video program and audio program information. For example, an NTSC (National Television Standards Committee) television signal may include two bytes of closed captioning data during the latter half of each occurrence of line 21 of field 1. Closed caption data may be decoded and displayed to provide a visible text representation of a television programs audio content. Additional closed caption data and other types of auxiliary information, such as extended data services information (XDS), may be included in other line intervals such as line 21 of field 2. These other types of auxiliary data such as XDS are encoded in a similar manner to closed caption data and can be decoded using a caption decoder. Because most television receivers sold in the U.S. include caption decoders (U.S. law requires all television receivers larger than 13 in size to include a caption decoder), most television receivers can decode and utilize auxiliary data such as XDS data.

One important application of XDS data is providing the so-called V-chip capability. A television receiver that provides V-chip capability permits a user to prevent certain programs and/or scenes from being viewed and heard based on the content of the program/scenes. For example, a user might specify that programs and/or scenes including violent subject matter should be excluded. Alternatively, a user can specify a rating limit, such as PG-13, and programs and scenes exceeding that limit (e.g., R and X rated programs) could not be viewed or heard. By decoding program content information included in XDS data, a television receiver can determine the content and rating of television programs and scenes and can compare the content and rating to the limits set by a user. For those programs and scenes that exceed the specified limits, the video display is modified, e.g., blanked, and the audio is muted. In addition, the receiver may display a message indicating the reason for the interrupted reception and the expected duration of the interruption (e.g., SCENE EXCEEDS CONTENT LIMIT).

In addition to auxiliary data decoding capability, certain television receivers also include multi-image display capability. For example, certain television receivers include a picture-in-picture ("pix-in-pix" or "PIP") feature that, when activated, produces an image signal representing both a main image region and an auxiliary image region. A displayed image produced in response to the signal includes the auxiliary image (also referred to as "PIP image" or "small image") inset into the main image. Typically, the auxiliary image region displays video from a video source other than that supplying the main image region. For example, an auxiliary video signal source such as a VCR or a second tuner may provide the auxiliary video signal.

SUMMARY OF THE INVENTION

The invention resides, in part, in recognizing that a video signal processing system designed to produce a signal representing a multi-image display creates special problems in regard to providing V-chip capability. In particular, the inventor has recognized that it may be desirable to independently monitor V-chip data for each of the main and auxiliary video signal sources. In addition, it may be desirable to modify the main and auxiliary images independently in response to the respective V-chip data, e.g., blanking the main image in response to V-chip data from the main video signal independent of whether the auxiliary image is being blanked in response to auxiliary-picture V-chip data. As used herein in regard to changing an image in response to auxiliary information such as V-chip data, the terms "modify" and "blank" are intended to indicate various modifications of a video image. For example, an image representing video program information can be blanked to black in response to V-chip data. Alternatively, an image can be replaced with a single color screen such as a blue screen. Also, an image can be replaced with a single color screen on which an informative message is displayed or can be replaced with a particular predetermined image or pattern such as an icon indicating the reason for the image modification. Many variations and combinations of image modification are envisioned.

The inventor has also recognized that simply replacing a video signal by another signal, e.g., a blanking level, may cause problems. For example, simply replacing a signal with a blanking level may eliminate auxiliary information such as XDS data, and in particular program rating information, that is needed. Also, synchronizing information such as sync pulses included in a synchronization component of a composite video signal (e.g., horizontal and vertical sync pulses) may be corrupted. Television circuitry, such as a deflection circuit, typically includes a phase locked loop that depends on sync pulses to achieve a locked condition needed to produce reliable deflection waveforms. Eliminating sync pulses by blanking in response to V-chip data could prevent the deflection circuit from operating properly.

The inventor has further recognized that solving the problems described thus far for certain video signals may not provide the desired image modification feature for all video signals. Specifically, it may be advantageous to implement image modification for one type of video signal in a portion of a video signal processing channel that is not used for processing another type of video signal. As a result, the other type of video signal cannot be modified in response to auxiliary information unless, undesirably, additional image modification circuitry is included in another portion of the video signal processing channel. For example, the inventor has recognized that for composite video signals in certain television systems it is desirable to implement an image modification feature in conjunction with a comb filtering function that implements chroma-luma separation. However, such television systems may also have the capability to process s-video signals. The chroma and luma components of an s-video signal are separate and, therefore, comb filtering is not required for an s-video signal. As a result, image modification that is implemented in conjunction with comb filtering does not affect an s-video signal.

The invention also resides, in part in providing video signal processing apparatus for solving the described problems. More specifically, apparatus constructed in accordance with one aspect of the invention produces an output signal having a first signal component representing a first video program included in a first video signal and having a second signal component representing a second video program included in a second video signal. The output signal is suitable for coupling to a display device for producing an image having first and second regions representing the first and second video programs, respectively. A control device modifies the output signal such that the first signal component of the output signal represents video information other than video program information included in the first video signal and the second signal component of said output signal represents the second video program.

The apparatus may include a processor for processing auxiliary information included in the first video signal for determining the content of said first video program. The control device can be coupled to the processor for modifying the first signal component of the output signal in response to the content of the first video program. The video information other than video program information included in the first video signal can represent at least one of a blanked image, a message, and a predetermined image. For example, modification of the output signal may be such that the one region of a displayed image is blanked while the other region is unaffected.

The control device may also provide for modifying the output signal only during a first portion of the first video signal. For example, the first portion may include active video information and exclude synchronizing information included in said first video signal. In addition, the control device may also detect a peak value of the synchronizing information included in the first video signal and prevent modification of the first signal component of the output signal during an interval including the peak value. If coupled to a display device, the resulting displayed image provides a multi-image display, such as a picture-in-picture (PIP) or picture-outside-picture (POP) display, in which the first image region corresponds to one of a main image region and an auxiliary image region and the second image region corresponds to the other one of the main and auxiliary image regions.

In accordance with another aspect of the invention, apparatus incorporating principles of the invention includes a display device and a video signal processing channel for processing first and second television signals to produce an output signal having a first signal component representing a first television program included in the first television signal, and having a second signal component representing a second television program included in the second television signal. The output signal is coupled to the display device for producing a displayed image having first and second image regions representing the first and second television programs, respectively. A first processor processes first auxiliary information included in said first television signal for determining the content of said first television program. A second processor processes second auxiliary information included in the second television signal for determining the content of the second television program. A control device modifies the first signal component of the output signal in response to the first auxiliary information indicating that the first video program includes a first type of content. The control device also modifies the second signal component of the output signal in response to the second auxiliary information indicating that the second video program includes a second type of content. The control device modifies the first and second signal components of the output signal independently.

Another aspect of the invention involves apparatus including a first signal path for providing a first type of video signal having an image signal component representing a first video program, and a second signal path for providing a second type of video signal having an image signal component representing a second video program. A control device included in the first signal path is responsive to auxiliary information included in the first and second types of video signals, to indicate the content of the first and second video programs, for modifying the first image signal component to produce a modified first image signal component in response to the auxiliary information indicating the first video program has a particular content. Also included is a coupling arrangement for coupling the first signal path to an output signal path when the first image signal component is to be utilized, for coupling the second signal path to the output signal path when the second image signal component is to be utilized, and for coupling the first signal path to the output signal path for providing the modified first image component to the output signal path when the second image signal component is to be utilized and the content of the second video program is the particular content. The first type of video signal may correspond to a composite television signal, and the second type of video signal may correspond to an s-video signal. The control device may comprise a comb filter.

BRIEF DESCRIPTION OF THE DRAWING

The invention may be better understood by referring to the drawing in which.

DETAILED DESCRIPTION

Figure 1:
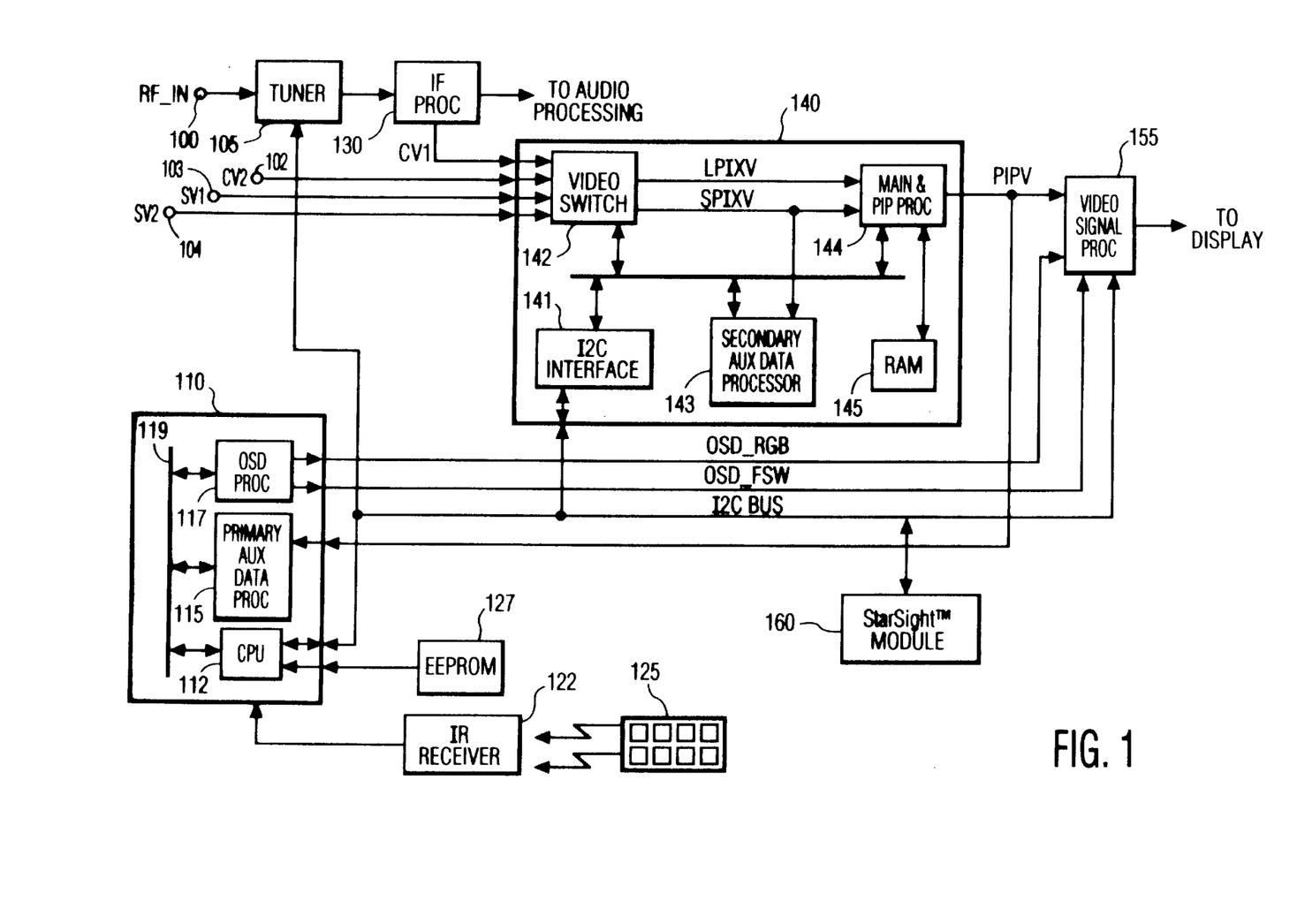
FIG. 1 shows, in block diagram form, an exemplary video signal processing system.

The television receiver shown in FIG. 1 has a first input 100 for receiving television signal RF_IN at RF frequencies, a second input 102 for receiving baseband composite video television signal CV2, and two inputs 103 and 104 for receiving s-video inputs SV1 and SV2, respectively. Although shown as single input lines, each of signals SV1 and SV2 comprise two separate signal lines: an s-video luma signal and an s-video chroma signal. Signal RF_IN may be supplied from a source such as an antenna or cable system while signal CV2 may be supplied, for example, by a video cassette recorder (VCR). Tuner 105 and IF processor 130 operate in a conventional manner for tuning and demodulating a particular television signal that is included in signal RF_IN. IF processor 130 produces baseband composite video signal CV1 representing the video program portion of the tuned television signal. IF processor 130 also produces a baseband audio signal that is coupled to an audio processing section (not shown in FIG. 1) for further audio processing. Although FIG. 1 shows input 102 as a baseband signal, the television receiver could include a second tuner and IF processor similar to units 105 and 130 for producing a second baseband video signal from either signal RF_IN or from a second RF signal source.

The system shown in FIG. 1 also includes a main microprocessor (µP) 110 for controlling components of the television receiver such as tuner 105, picture-in-picture processing unit 140, video signal processor 155, and StarSight® data processing module 160. As used herein, the term "microprocessor" represents various devices including, but not limited to, microprocessors, microcomputers, microcontrollers and controllers. Microprocessor 110 controls the system by sending and receiving both commands and data via serial data bus $I^2C$ BUS which utilizes the well-known $I^2C$ serial data bus protocol. More specifically, central processing unit (CPU) 112 within µP 110 executes control programs contained within memory, such as EEPROM 127 shown in FIG. 1, in response to commands provided by a user, e.g., via IR remote control 125 and IR receiver 122. For example, activation of a "CHANNEL UP" feature on remote control 125 causes CPU 112 to send a "change channel" command along with channel data to tuner 105 via $I^2C$ BUS. As a result, tuner 105 tunes the next channel in the channel scan list.

CPU 112 controls functions included within µP 110 via bus 119 within µP 110. In particular, CPU 112 controls primary auxiliary data processor 115 and on-screen display (OSD) processor 117. Auxiliary data processor 115 extracts auxiliary data such as closed caption data, StarSight® data, and XDS data, including V-chip data, from a television signal. OSD processor 117 operates in a conventional manner to produce R, G, and B video signals OSD_RGB that, when coupled to a display device, will produce a displayed image representing on-screen display information such as graphics and/or text. OSD processor 117 also produces control signal OSD_FSW which is intended to control a fast switch for inserting signals OSD_RGB into the system's video output signal at times when an on-screen display is to be displayed. For example, when a user enables closed captioning, e.g., by activating a particular switch on remote control 125, CPU 112 enables processors 115 and 117 so that processor 115 extracts the closed caption data from line 21 intervals of video signal PIPV. Processor 117 produces signals OSD_RGB representing the closed caption data. Processor 117 also produces signal OSD_FSW indicating when the caption is to be displayed.

CPU 112 also controls auxiliary data decoder 115 for extracting StarSight® data. StarSight® data is typically received only on a particular television channel and the television receiver must tune that channel to extract StarSight® data. To prevent StarSight® data extraction from interfering with normal use of the television receiver, CPU 112 initiates StarSight® data extraction by tuning the particular channel only during a time period when the television receiver is usually not in use (e.g., 2:00 AM). At that time, CPU 112 configures decoder 115 such that auxiliary data is extracted from horizontal line intervals such as line 16 that are used for StarSight® data. CPU 112 controls the transfer of extracted StarSight® data from decoder 115 via $I^2C$ BUS to StarSight® module 160. A processor internal to the module formats and stores the data in memory within the module. In response to the StarSight® program guide display being activated (e.g., a user activating a particular key on remote control 125), CPU 112 transfers formatted StarSight® program guide display data from StarSight® module 160 via $I^2C$ BUS to OSD processor 117 which generates the graphics and text signals needed to produce the StarSight® program guide display.

When V-chip data processing is enabled, e.g., by a user selecting a particular rating limit via remote control 125, CPU 112 configures auxiliary data processor 115 for extracting XDS data and, in particular, V-chip data. CPU 112 continually monitors the received V-chip data to determine the content (e.g., rating, program title, program category, etc.) of television programming included in the television signal. As a specific example, CPU 112 monitors the received V-chip data and compares received programming information to a user-selected rating limit. If the rating of a particular program or scene is unacceptable, CPU 112 sends a control signal via $I^2C$ BUS to PIP unit 140 which modifies the displayed image as described in detail below.

V-chip related modification of the image may include blanking the image until the received rating data indicates that the received program (or scene) has an acceptable rating. In addition to blanking the image, CPU 112 may cause OSD processor 117 to generate signals OSD_RGB representing a text message that will be displayed on the blanked screen indicating, for example, the reason for and expected duration of the image modification. Blanking the image as referred to herein in regard to V-chip related modification of the image may involve replacing the normal video program display with a screen of a particular color, such as a blue screen, with or without a displayed message, or displaying a predetermined fixed image such as a particular scene or icon, or displaying a predetermined sequence of images stored in memory. As an alternative to blanking the image, CPU 112 could cause tuner 105 to select a different channel, for example, if the V-chip violation is expected to be of long duration (program related rather than scene related). Any or all of the described options could be user selected via on-screen set-up menus.

Video signal processor (VSP) 155 performs conventional video signal processing functions, such as luma and chroma processing. Output signals produced by VSP 155 are suitable for coupling to a display device, e.g., a kinescope or LCD device (not shown in FIG. 1), for producing a displayed image. VSP 155 also includes a fast switch for coupling signals produced by OSD processor 117 to the output video signal path at times when graphics and/or text is to be included in the displayed image. The fast switch is controlled by control signal OSD_FSW which is generated by OSD processor 117 in main microprocessor 110 at times when text and/or graphics are to be displayed.

The input signal for VSP 155 is signal PIPV that is output by picture-in-picture (PIP) unit 140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. The described operation of PIP unit 140 is provided by features of PIP unit 140 including video switch 142, I²C interface 141, main & PIP processor 144 and RAM 145. Switch 142 operates under user control for determining the coupling of the two input video signals VIDEO and VIDEO IN to the large and small pix signals LPIXV and SPIXV within PIP unit 140. Typically, switch 142 couples one of signals CV1, CV2, SV1 and SV2 to signal LPIXV and couples another one of the four signals to signal SPIXV, but switch 142 can swap the connections or couple one input signal to both the large and small picture signal lines. As indicated above, each of signals SV1 and SV2 comprises separate luma and chroma signals. Thus, selecting the s-video inputs requires switch 142 to couple both signals associated with the particular s-video signal to main & PIP processor 144. I²C interface 141 provides a bi-directional control and data interface between the I²C BUS and the functions within PIP unit 140. Thus, main $\mu$P 110 can control the operation of switch 142 and main & PIP processor 144 via the I²C BUS.

When PIP processing is activated, main & PIP processor 144 implements the PIP function in a conventional manner. Briefly, processor 144 converts signal SPIXV to digital data via analog-to-digital converters (ADC) that are included in main & PIP processor 144. The digital data is subsampled to reduce the amount of data and to reduce the size of the small picture image that is displayed. The subsampled data is stored in RAM 145 until the small picture display interval at which time the stored small-picture data is read from RAM 145 and converted into an analog small picture signal via digital-to-analog converters (DAC) that are included in main & PIP processor 144. A switch included in processor 144 includes the analog small picture signal in signal PIPV during the small picture display interval.

An exemplary embodiment of the features of the system shown in FIG. 1 that have been described thus far comprises an ST9296 microprocessor produced by SGS-Thomson Microelectronics for providing the features associated with $\mu$P 110; an M65616 picture-in-picture processor produced by Mitsubishi for providing the described basic PIP functionality associated with PIP processor 140; and an LA7612 video signal processor produced by Sanyo for providing the functions of VSP 155. In accordance with aspects of the invention, PIP unit 140 in FIG. 1 also includes secondary auxiliary data processor (or decoder) 143. As explained in detail below, decoder 143 decodes auxiliary data included in the small pix signal, i.e. in signal SPIXV. Data decoded from signal SPIXV, such as V-chip, closed caption, or StarSight® data, is buffered and transferred to $\mu$P 110 via I²C BUS for subsequent processing under control of CPU 112. In addition to the features of processor 143 relating to extraction and buffering of auxiliary data that are described below, decoder 143 also provides features that facilitate displaying closed caption data associated with the small picture signal, i.e., PIP captioning. Features of the system shown in FIG. 1 that relate in particular to PIP captioning are described in detail in the following U.S. patent application Ser. Nos. 08/770,770 (Attorney Docket No. RCA 88,200) entitled "METHOD AND APPARATUS FOR POSITIONING AUXILIARY INFORMATION PROXIMATE AN AUXILIARY IMAGE IN A MULTI-IMAGE DISPLAY", 08/769,331 (Attorney Docket No. RCA 88,489), U.S. Pat. No. 5,929,927, entitled "METHOD AND APPARATUS FOR PROVIDING A MODULATED SCROLL RATE FOR TEXT DISPLAY", and 08/769,332 (Attorney Docket No. RCA 88,490) entitled "METHOD AND APPARATUS FOR REFORMATTING AUXILIARY INFORMATION INCLUDED IN A TELEVISION SIGNAL", all of which were filed in the name of Mark F. Rumreich et al. on the same date as the present application, are commonly assigned, and are incorporated herein by reference.

Figure 2:
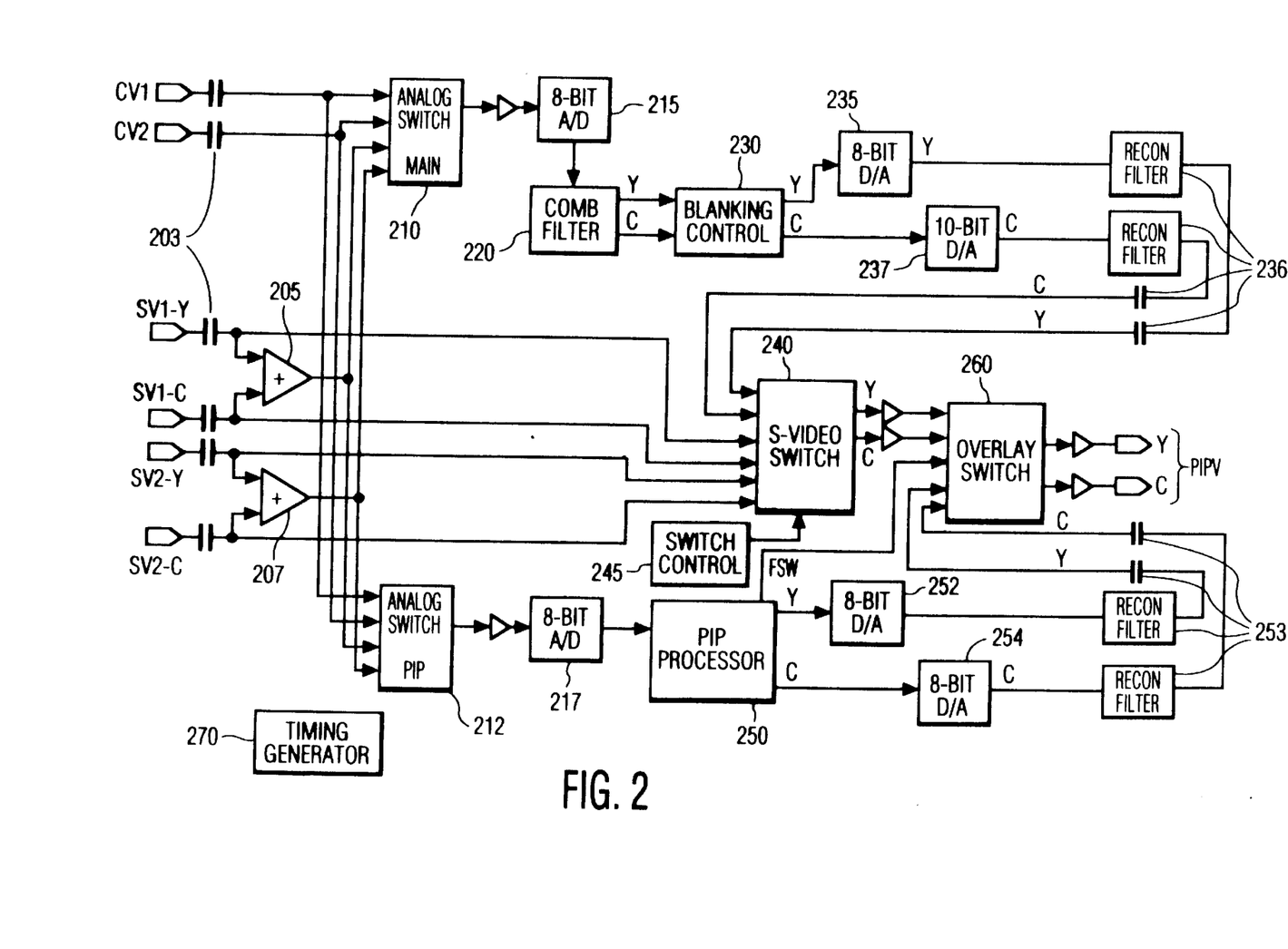
FIG. 2 shows, in block diagram form, an embodiment of a portion of the system shown in FIG. 1 incorporating principles of the invention.

FIG. 2 shows a more detailed embodiment of portions of PIP unit 140 in FIG. 1 and, in particular, of video switch 142 and main & PIP processor 144. In FIG. 2, composite video inputs CV1 and CV2 and s-video inputs SV1 (comprising luma signal SV1-Y and chroma signal SV1-C) and SV2 (luma signal SV2-Y and chroma signal SV2-C) are AC coupled via coupling capacitors 203 to analog switches 210 and 212. Switch 210 selects a composite video signal for processing by the main composite video signal processing channel. Switch 212 selects a composite video signal for processing by the auxiliary composite video signal processing channel. Switches 210 and 212 are controlled in response to user selection, e.g., via remote control 125 in FIG. 1, of a video signal source. Main $\mu$P 110 communicates the users selection to switches 210 and 212 in unit 140 via the I²C bus.

The main composite video signal processing channel provides features such as luma-chroma separation of the composite video signals. If the user selects an s-video signal as the source for the main image, luma-chroma separation is unnecessary and, thus, the s-video luma and chroma input signals bypass the composite video signal processing channel via switch 240. However, information such as color burst is obtained and processed from composite video signals in the composite video signal processing channel. Color burst information is also needed for the s-video signals and, therefore, adders 205 and 207 combine the SV1 and SV2, respectively, luma and chroma signals to produce composite signals from the s-video components. These s-video-related composite signals are selected by switches 210 and 212 for processing by the composite video signal processing channel when an s-video signal source is selected as a signal source.

In the main picture composite video signal processing channel, the output of switch 210 is coupled to 8-bit analog to digital converter (ADC or A/D) 215 which produces a digital representation of the analog output from switch 210. Comb filter 220 filters the digital composite signal output from A/D 215 to produce digital luma (Y) and chroma (C) components.

In accordance with an aspect of the invention, the digital Y and C components from comb filter 220 are processed in blanking control unit 230 to implement blanking of the main picture as described in detail below. Briefly, blanking of the main picture may be required, for example, if main-picture rating information (V-chip data) processed by main $\mu$P 110 in FIG. 1 indicates that the current video program represented by the main picture component of signal PIPV in FIG. 1 exceeds the current rating limit. If so, main $\mu$P 110 sends a signal MAIN_BLANKING to unit 140 in FIG. 1 via the I²C bus and blanking control 230 responds by modifying the main picture Y and C signals such that the main picture region of the displayed image is modified. Possible forms of modification include blanking or displaying a predetermined image such as an icon that would indicate to a user the reason for the blanking.

The Y and C outputs from blanking control unit 230 are coupled to respective digital-to-analog converters (D/A or DAC) 235 and 237. The resulting analog Y and C signals are coupled via filtering 236 to the above-mentioned s-video switch 240. Switch 240 is controlled by switch control 245 to select one of the SV1 or SV2 luma-chroma signal pairs or the luma-chroma output signal pair from the main picture composite video signal processing channel. The output of switch 240 provides the main picture video signal. Switch control unit 245 and switch 240 operate in accordance with an aspect of the invention to provide modification of the s-video signals if modification is needed, e.g., blanking in response to V-chip data. A detailed description of switch 240 and switch control 245 is provided below.

The luma-chroma signal components selected by switch 240 provide one Y-C input pair to overlay switch 260. Switch 260 combines the auxiliary image signal from the auxiliary composite video signal processing channel (PIP image processing channel in FIG. 2) with the main picture signal to produce a luma-chroma signal pair corresponding to signal PIPV in FIG. 1. Signal PIPV includes two signal components: one occurring during the main picture interval representing the main picture and another occurring during the auxiliary image interval representing the auxiliary image. Switch 260 is controlled by signal FSW (fast switch) from processor 250 in FIG. 2 such that the main and auxiliary image signals are inserted in signal PIPV during the appropriate display intervals. When coupled to a display device such as, for example, a kinescope via video signal processor 155 in FIG. 1, a display is produced that has one region displaying a video program included in the main picture signal and has a second region displaying a video program included in the auxiliary image signal.

In the auxiliary image composite video signal processing channel, the analog output from switch 212 is coupled to A/D 217 which produces a digital signal that is coupled to processor 250. Processor 250 produces an auxiliary image signal such as a PIP image signal in the manner described above in regard to main & PIP processor 144 in FIG. 1. Processor 250 also includes timing circuitry for keeping track of when the auxiliary image should be inserted in the main picture and generates signal FSW causing switch 260 to insert the auxiliary image at the appropriate time.

The luma and chroma output signals from processor 250 are coupled to D/A converters 252 and 254, respectively, which produce analog luma and chroma signals. These analog signals representing the auxiliary image are coupled via filters 253 to an input of overlay switch 260

Also included in the system shown in FIG. 2 is timing generator 270. Timing generator 270 processes a composite sync signal component of the main picture to produce timing signals that are used for controlling various operations in the system shown in FIG. 2. For example, timing generator 270 includes conventional sync separator circuits for generating horizontal and vertical sync signals that control pixel and line counters. The pixel and line count values are used to determine when to generate signal FSW for inserting the auxiliary image.

In accordance with an aspect of the invention, the pixel and line count values produced by timing generator 270 are also used to control blanking control unit 230. The inventor has recognized that modification of the main picture signal as performed by blanking control unit 230 should occur only during a portion of the video signal. More specifically, modification of the video signal should occur only during active picture intervals, not during intervals when synchronization information is present in the video signal, e.g., during vertical and horizontal sync intervals. As described above, modification of the synchronization information may cause phase locked loop circuitry such as that included in deflection circuits from operating properly. In particular, it is desirable to disable modification of the video signal during sync peak intervals.

Figure 3A:
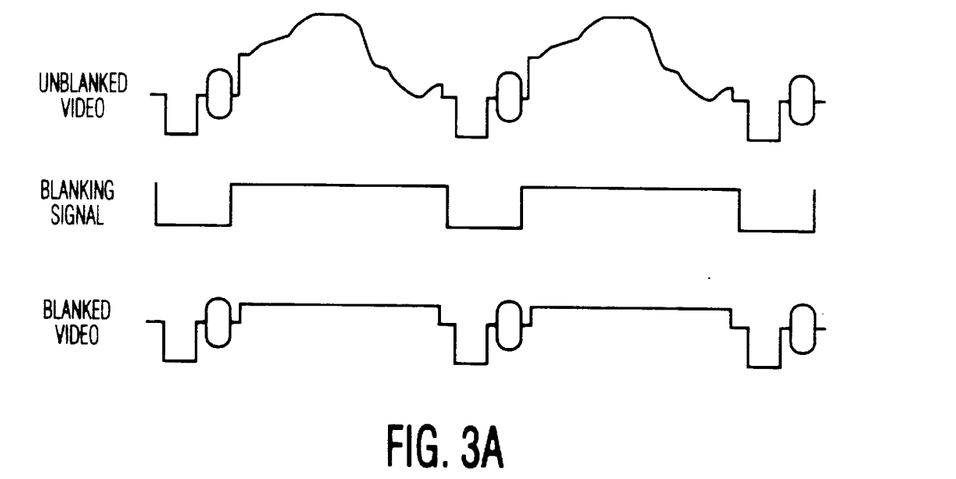
FIGS. 3A and 3B show signal waveforms illustrating an aspect of the invention.
Figure 3B:
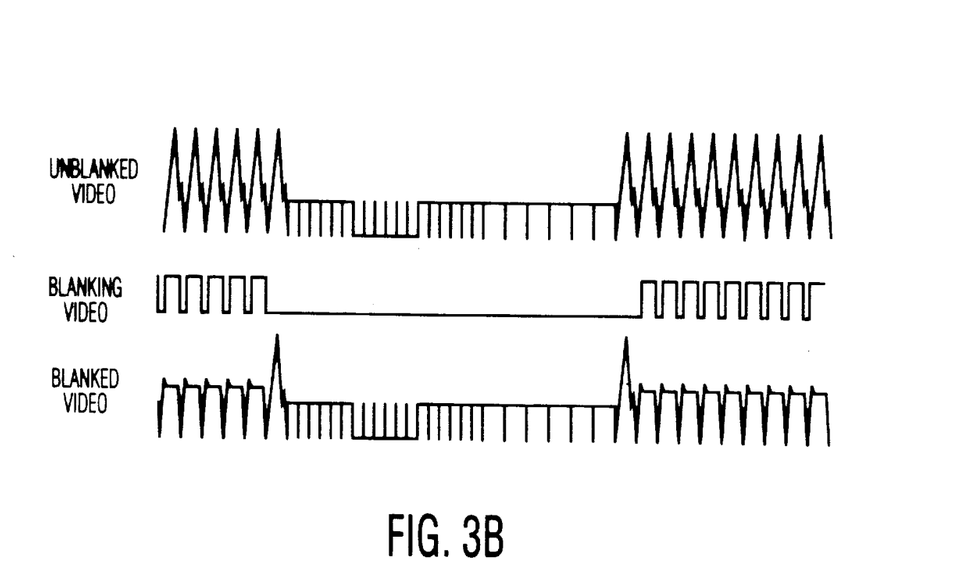

FIGS. 3A and 3B show the desired operation of the signal modification function provided by blanking control unit 230 in FIG. 2. More specifically, FIG. 3A shows the desired blanking signal characteristics during horizontal intervals. Combining the blanking signal in FIG. 3A with the unblanked video signal produces the blanked video signal shown in FIG. 3A which includes modification of the video signal during active video portions of the signal. No modification of the video signal occurs during the horizontal sync and burst portions of each line interval.

FIG. 3B shows characteristics of the desired blanking signal during the vertical retrace interval. Specifically, the blanking signal disables modification of the video signal during the vertical retrace interval such that the vertical sync information is retained. In addition, prevention of video signal modification during vertical retrace is extended to include line intervals such as line 21 that may include auxiliary information. As a result, necessary auxiliary information such as XDS data (V-chip information) is preserved.

Figure 4:
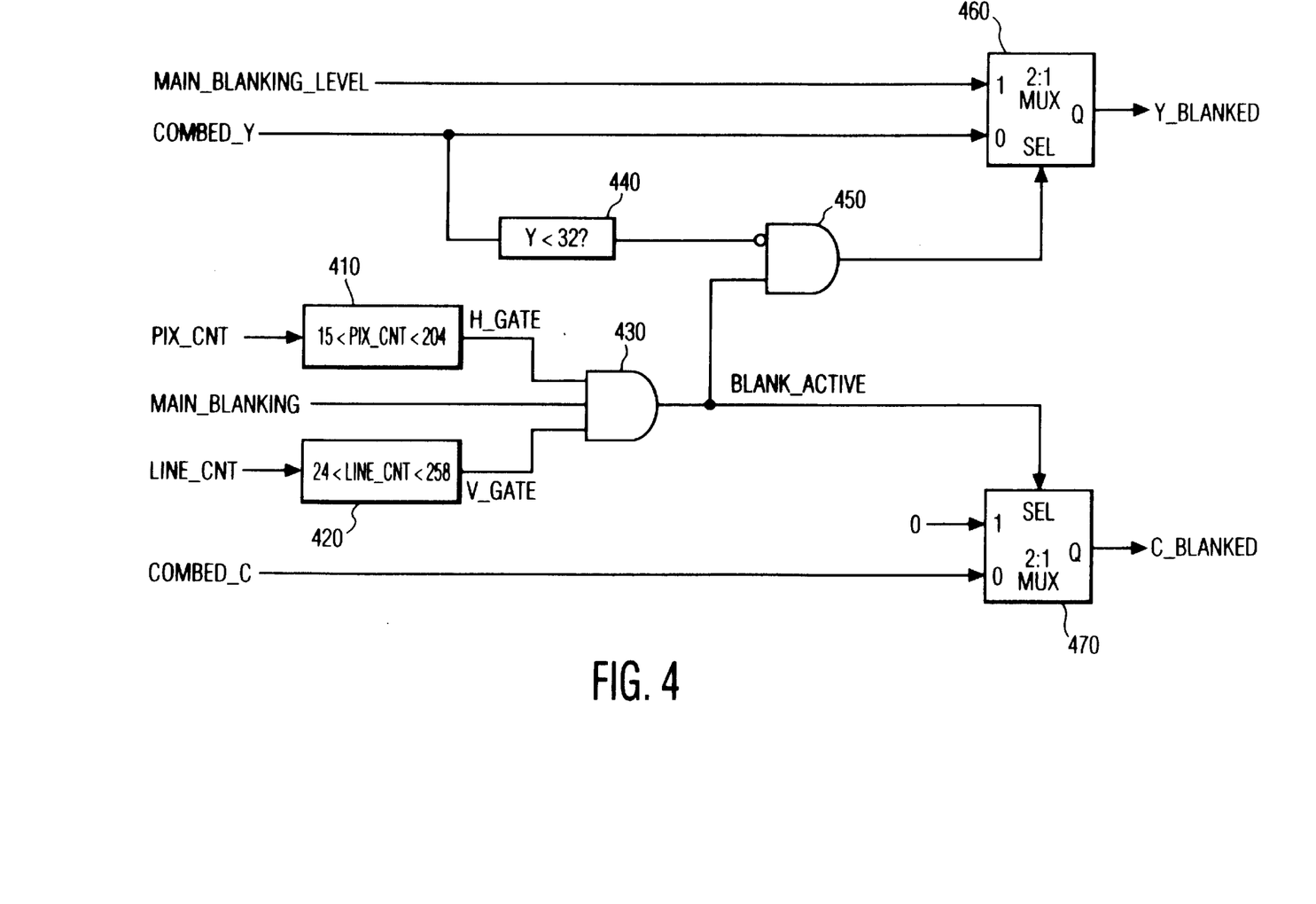
FIG. 4 shows, partially in block diagram form and partially in schematic diagram form, a portion of the embodiment shown in FIG. 2.

FIG. 4 shows an embodiment of blanking control unit 230 in FIG. 2 including features for providing the desired blanking characteristics shown in FIGS. 3A and 3B. In FIG. 4, a pixel count signal PIX_CNT and a line count signal LINE_CNT are input to comparators 410 and 420, respectively. Signal PIX_CNT indicates the current horizontal location in the display, i.e., within a particular line interval, while signal LINE_CNT indicates the current vertical location in the display. Comparator 410 produces a gating signal H_GATE that is active (e.g., logic 1 as in FIG. 4) when the pixel count is between 15 and 204. The pixel count being in this range indicates that the current location within a line is during active video. That is, pixel counts less than 15 or greater than 204 correspond to the horizontal sync and burst intervals. Similarly, comparator 420 produces a gating signal V_GATE which, when active, indicates that the current vertical position is at a line between 24 and 258. That is, a line count less than 24 or greater than 258 corresponds to vertical blanking or a line interval such as line 21 within the overscan region that includes desired auxiliary information. The pixel count and line count ranges implemented in blocks 410 and 420 are exemplary and can be modified to define different portions of the vertical and horizontal intervals.

AND gate 430 combines signals H_GATE and V_GATE with a control signal MAIN_BLANKING to produce a signal BLANK_ACTIVE which has a logic 1 value when blanking is enabled. Signal MAIN_BLANKING is a control bit that is generated by main $\mu$P 110 in FIG. 1 and communicated to PIP unit 140 in FIG. 1 via the I$^2$C bus. Signal MAIN_BLANKING is active (at logic 1) when blanking is needed, e.g., when auxiliary data decoded by processor 115 in FIG. 1 indicates that the rating of the video program or scene currently being displayed in the main picture exceeds the user-specified rating limit. The gating together of signals H_GATE, V_GATE and MAIN_BLANKING by AND gate 430 to produce signal BLANK_ACTIVE causes signal BLANK_ACTIVE be active only during active video portions of the main picture signal. Thus, signal BLANK_ACTIVE provides the desired blanking signal characteristics that are depicted in FIGS. 3A and 3B.

Signal BLANK_ACTIVE controls blanking of the main picture chroma and luma signals by controlling multiplexers (i.e., "MUX") 460 and 470 in FIG. 4. To control chroma blanking, signal BLANK_ACTIVE directly controls MUX which couples either 0 or signal COMBED_C (chroma output from comb filter 220 in FIG. 2) to signal C_BLANKED which represents the chroma output signal from blanking control unit 230 in FIG. 2. A logic 0 on signal BLANK_ACTIVE selects signal COMBED_C. A logic 1 on signal BLANK_ACTIVE selects 0 which blanks the main picture chroma output. The chroma blanking level could be a value other than 0. For example, the chroma blanking level could be replaced by a reference chroma carrier representing a particular color, such as blue, if a colored screen is desired during blanking. Alternatively, the chroma blanking level could be controlled, for example, by μP 110 in FIG. 1 via the I²C bus.

To control luma blanking, signal BLANK_ACTIVE controls MUX 460 via AND gate 450 for coupling either a blanking level MAIN_BLANKING_LEVEL or signal COMBED_Y (luma output from comb filter 220) to signal Y_BLANKED which represents the luma output signal from blanking control unit 230. Signal MAIN_BLANKING_LEVEL is a main picture blanking level that is controlled by μP 110 in FIG. 1 via the I²C bus. AND gate 450 is included in the embodiment shown in FIG. 4 along with comparator 440 in accordance with an aspect of the invention.

More specifically, the pixel and line count values PIX_CNT and LINE_CNT may not accurately indicate the active areas of the video signal during conditions such as following a channel change. If blanking were enabled at such times, synchronization information may be blanked undesirably causing circuitry such as certain phase locked loops to fail to achieve lock as described above. Comparator 440 generates a signal at an active level (logic 1 in FIG. 4) if the luma level (signal COMBED_Y) is less than a predetermined low level (32 in FIG. 4). The low level is intended to detect the level of a sync tip in the synchronizing signal component of the main picture video signal. An active level at the output of comparator 440 indicates that the current luma value is a sync tip, i.e., important synchronizing information that should not be blanked. The output of comparator 440 is coupled to an inverting input of AND gate 450 so that an active level at the output of comparator 440 causes the control input to MUX 460 to be logic 0 independent of the state of signal BLANK_ACTIVE, thereby disabling blanking. As a result, signal COMBED_Y is certain to be coupled to signal Y_BLANKED during sync tip intervals.

Figure 5A:
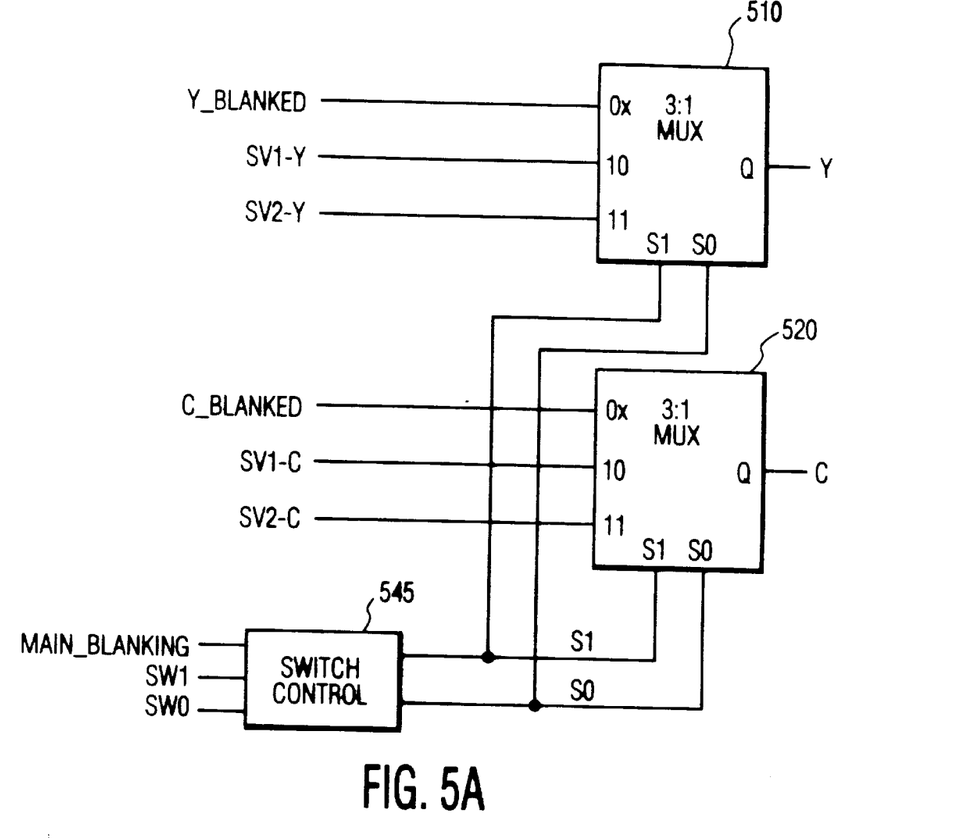
FIGS. 5A and 5B show, in block diagram form, an embodiment of another portion of the embodiment shown in FIG. 2.
Figure 5B:
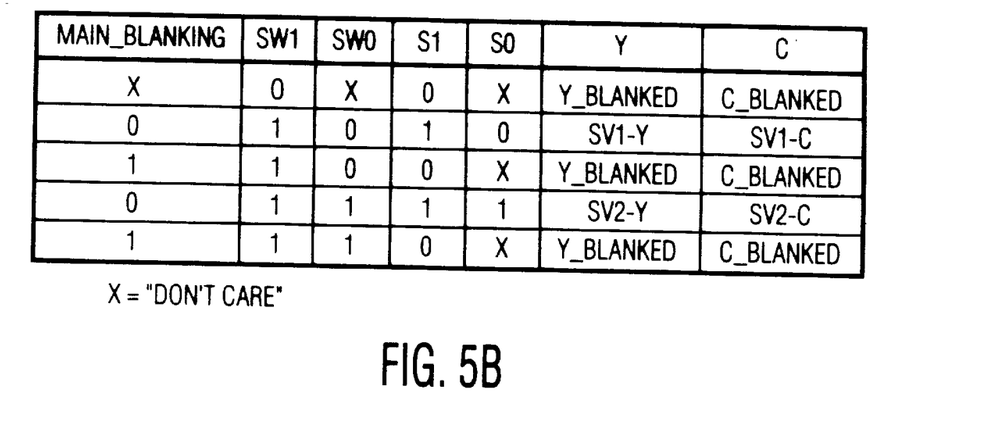

FIGS. 5A and 5B show an embodiment of s-video switch 240 and switch control unit 245 in FIG. 2. In FIG. 5A, MUX 510 and MUX 520 implement the function of switch 240. MUX 510 produces the luma output signal for switch 240 by coupling one of signals Y_BLANKED, SV1-Y, and SV2-Y to signal Y in FIG. 5 which corresponds to the Y output from switch 240 in FIG. 2. Similarly, MUX 520 produces the chroma output signal for switch 240 by coupling one of signals C_BLANKED, SV1-C, and SV2-C to signal C in FIG. 5 which corresponds to the C output from switch 240 in FIG. 2. MUXs 510 and 520 are controlled by signals S1 and S0 from switch control unit 545 which corresponds substantially to switch control unit 245 in FIG. 2.

Switch control 545 includes digital circuitry that produces MUX control signals S1 and S0 in response to three signals, namely signals MAIN_BLANKING, SW1 and SW0. Signal MAIN_BLANKING is the same as the signal of the same name that was described above in regard to FIG. 4 and is generated by main μP 110 in FIG. 1 when blanking is required. Signals SW1 and SW0 are also generated by main μP 110 and indicate the main picture video signal source that has been selected by a user (e.g., using remote control 125 in FIG. 1). As in the case of signal MAIN_BLANKING, signals SW1 and SW0 are provided to switch control unit 545 via the I²C bus.

FIG. 5B shows a "truth table" which defines the operation of switch control 545 in FIG. 5A for generating signals S1 and S0 from signals MAIN_BLANKING, SW1, and SW0. In accordance with an aspect of the invention, FIG. 5B shows that switch control 545 causes MUXs 510 and 520 to select signals Y_BLANKED and C_BLANKED from the composite video signal path (i.e., via the comb filter) when blanking is active (signal MAIN_BLANKING at logic 1) for all signal sources. That is, even though an s-video signal path has been selected as the main picture signal source, activation of main picture blanking activates blanking control 230 in FIG. 2 and causes the composite video signal processing path to be selected to provide the blanked main picture signal. This feature advantageously makes additional blanking circuitry in the s-video path unnecessary.

Figure 6:
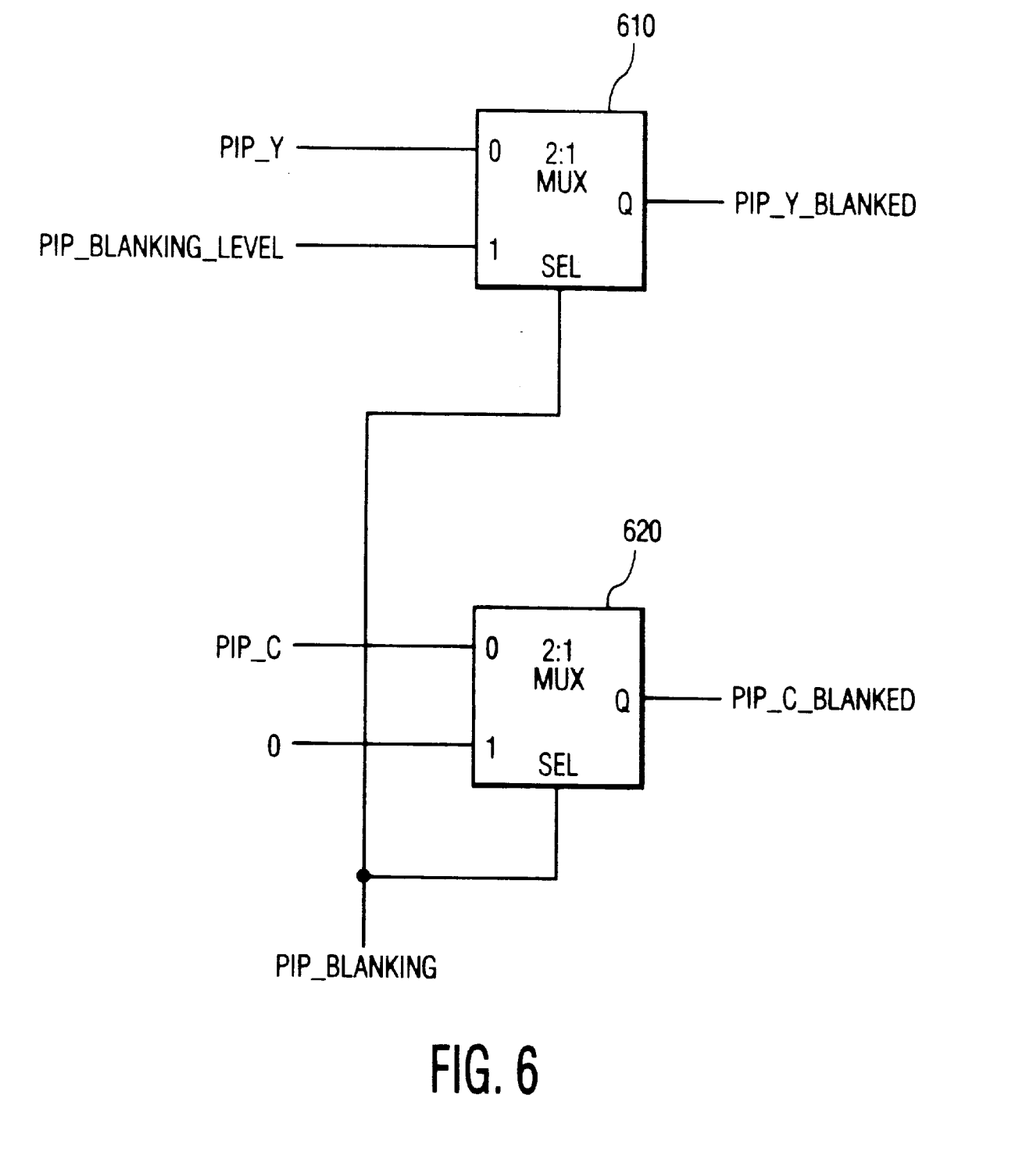
FIG. 6 shows, in block diagram form, an embodiment of another portion of the embodiment shown in FIG. 2.

In accordance with another aspect of the invention, FIG. 6 shows an embodiment of a feature that provides modification of an auxiliary image, such as blanking the small picture in a picture-in-picture (PIP) display, independent of the modification of the main picture that is described above. In the exemplary PIP system of FIG. 1, modification of a PIP image may be necessary, for example, when rating information in an auxiliary signal component of the PIP video signal indicates that content of PIP video program exceeds a user specified rating limit. However, the video program displayed in the main picture may not exceed the rating limit and, therefore, should not be blanked.

As described above, the system shown in FIG. 1 includes a secondary auxiliary data processor 143 that operates independently of primary (main picture) auxiliary information processor 115 for decoding auxiliary data included in the PIP video signal. The auxiliary information from processor 143 is communicated to main μP 110 via the I²C bus for analysis such as comparison of rating information for video programs included in the PIP video signal with a user-specified rating limit. If the auxiliary information indicates that the rating of the PIP video programs exceeds the rating limit, blanking of the PIP image is activated by μP 110 generating a control signal such as signal PIP_BLANKING in FIG. 6. The control signal is communicated to the PIP blanking control circuit in FIG. 6 from μP 110 via the I²C bus.

The exemplary PIP blanking embodiment shown in FIG. 6 comprises two 2:1 MUXs 610 and 620 that are included in PIP processor 250 in FIG. 2 and are controlled by signal PIP_BLANKING described above. MUX 610 produces a signal PIP_Y_BLANKED that corresponds to the luma output of PIP processor 250. During normal PIP operation, signal PIP_BLANKING is inactive (at logic 0 in FIG. 6) and a PIP video image is generated by MUX 610 coupling signal PIP_Y (the luma component of the PIP video signal prior to blanking) to signal PIP_Y_BLANKED. When modification of the PIP image is activated, signal PIP_BLANKING becomes active (at logic 1 in FIG. 6) and MUX 610 couples the PIP luma blanking level signal PIP_BLANKING_LEVEL to signal PIP_Y_BLANKED.

MUX 620 operates in a manner similar to that described for MUX 610 and produces a signal PIP_C_BLANKED that corresponds to the chroma output of PIP processor 250. During normal operation when signal PIP_BLANKING is inactive, MUX 620 couples signal PIP_C (the chroma component of the PIP video signal prior to blanking) to signal PIP_C_BLANKED. When signal PIP_BLANKING is active, a fixed chroma blanking level of 0 is coupled to signal PIP_C_BLANKED. Although shown as a fixed level of 0 in FIG. 6, the chroma blanking level could be replaced by a reference chroma carrier representing a particular color, such as blue. In addition, the chroma blanking level could be provided by a circuit that is controlled by μP 110 such that the chroma blanking level can be varied under microprocessor control. Also, rather than implementing chroma blanking as shown in FIG. 6, chroma could be blanked prior to chroma modulation, for example, by replacing R-Y and B-Y signals with 0 or with signals representing a particular color.

As is evident from the preceding description of FIGS. 4 and 6, the exemplary embodiments of main and auxiliary image modification features operate in response to respective control signals MAIN_BLANKING and PIP_BLANKING that can be controlled independently by μP 110. Thus, the described system provides for independently modifying the main and auxiliary images in a multi-image display as desired.

I claim:

1. Apparatus comprising:
    means for producing (155) an output signal having a first signal component representing a first video program included in a first video signal and having a second signal component representing a second video program included in a second video signal; said output signal being suitable for coupling to a display device for producing an image having first and second regions representing said first and second signal components, respectively; and
    control means for replacing said first signal component of said output signal with a signal component representing a predetermined image in response to auxiliary information included in said first video signal, said auxiliary information comprising content rating data, said second signal component being unaffected by replacement of said first signal component.

2. The apparatus of claim 1 further comprising a processor for processing the auxiliary information included in said first video signal for determining the content of said first video program; said control means being coupled to said processor for modifying said first signal component of said output signal in response to the content of said first video program.

3. The apparatus of claim 2 wherein said video information other than video program information included in said first video signal represents at least one of a blanked image, a message, and a predetermined image.

4. The apparatus of claim 3 wherein said control means comprises means for modifying said output signal only during a first portion of said first video signal.

5. The apparatus of claim 4 wherein said first portion of said video signal includes active video information and excludes synchronizing information and the auxiliary information included in said first video signal.

6. The apparatus of claim 5 wherein said control means comprises means for detecting a peak value of said synchronizing information included in said first video signal; said control means being responsive to detection of said peak value for preventing modification of said first signal component of said output signal during an interval including said peak value.

7. The apparatus of claim 6 further comprising the display device; and wherein said first region corresponds to one of a main image and an auxiliary image in a multi-image display; and said second region corresponds to an other one of said main image and said auxiliary image in said multi-image display.

8. The apparatus of claim 7 wherein said auxiliary image comprises one of a PIP image and a POP image.

9. Apparatus comprising:
    a display device;
    a video signal processing channel for processing first and second television signals to produce an output signal having a first signal component representing a first television program included in said first television signal, and having a second signal component representing a second television program included in said second television signal; said output signal being coupled to said display device for producing a displayed image having first and second image regions representing said first and second television programs, respectively;
    a first processor for processing first auxiliary information included in said first television signal for determining the content of said first television program;
    a second processor for processing second auxiliary information included in said second television signal for determining the content of said second television program; and
    control means for modifying said first signal component of said output signal in response to said first auxiliary information indicating that said first television program includes a first type of content, and for modifying said second signal component of said output signal in response to said second auxiliary information indicating that said second television program includes a second type of content; said control means modifying said first and second signal components of said output signal independent of each other.

10. The apparatus of claim 9 further comprising a timing generator for generating a timing signal for indicating a first portion of said first television signal and for indicating a second portion of said first television signal exclusive of said first portion; said control means being responsive to said timing signal for modifying said first signal component of said output signal only during said first portion of first television signal.

11. The apparatus of claim 10 wherein said first portion of said first television signal includes active video information and said second portion includes synchronizing information and auxiliary information.

12. The apparatus of claim 11 wherein said control means comprises means for detecting a peak value of said synchronizing information included in said first television signal; said control means being responsive to detection of said peak value for preventing modification of said first signal component of said output signal during an interval including said peak value.

13. The apparatus of claim 12 wherein said first image region corresponds to one of a main image and an auxiliary image in a multi-image display; and said second image region corresponds to an other one of said main image and said auxiliary image in said multi-image display.

14. The apparatus of claim 13 wherein said auxiliary image comprises one of a PIP image and a POP image.

15. The apparatus of claim 14 wherein said control means modifies said output signal such that said first signal component of said output signal represents at least one of a blanked image, a displayed message, and a predetermined image.

16. Apparatus for processing a video signal having a first signal component representing a video program and having a second signal component representing auxiliary information indicating the content of said video program, said apparatus comprising:
    a video signal processing channel for processing said video signal in a first format;
    a video signal path for providing said video signal in a second format;

control means included in said video signal processing channel for modifying said first signal component to produce a modified signal component in response to said auxiliary information indicating that said video program includes a particular content; and means for coupling said video signal processing channel to an output signal path when said video signal in said first format is to be utilized, for coupling said video signal path to said output signal path when said video signal in said second format is to be utilized, and for coupling said video signal processing channel to said output signal path for replacing a portion of said first signal component with said modified signal component when said video signal in said second format is to be utilized and said video program includes said particular content.

17. The apparatus of claim 16 further comprising a timing generator for generating a timing signal for indicating a first portion of said video signal and for indicating a second portion of said video signal exclusive of said first portion; said control means being responsive to said timing signal for modifying said first signal component only during said first portion of said video signal.

18. The apparatus of claim 17 wherein said first portion of said video signal includes active video information and said second portion includes synchronizing information and said auxiliary information.

19. The apparatus of claim 18 wherein said control means comprises means for detecting a peak value of said synchronizing information included in said video signal; said control means being responsive to detection of said peak value for preventing modification of said first signal component during an interval including said peak value.

20. The apparatus of claim 19 wherein said first format comprises a composite video signal format; and said second format comprises a s-video signal format.

* * * * *